(12) United States Patent
Maricevic et al.

(10) Patent No.: US 11,489,711 B2
(45) Date of Patent: *Nov. 1, 2022

(54) DIGITAL OPTICAL TRANSMITTER FOR DIGITIZED NARROWCAST SIGNALS

(71) Applicant: ARRIS Enterprises LLC, Suwanee, GA (US)

(72) Inventors: Zoran Maricevic, West Hartford, CT (US); Marcel F. Schemmann, Maria Hoop (NL); Dean Painchaud, Cromwell, CT (US); William P. Dawson, Manlius, NY (US); Zhijian Sun, Avon, CT (US)

(73) Assignee: ARRIS Enterprises LLC, Suwanee, GA (US)

( * ) Notice: Subject to any disclaimer, the term of this patent is extended or adjusted under 35 U.S.C. 154(b) by 402 days.

This patent is subject to a terminal disclaimer.

(21) Appl. No.: 15/891,142

(22) Filed: Feb. 7, 2018

(65) Prior Publication Data
US 2018/0167255 A1 Jun. 14, 2018

Related U.S. Application Data

(62) Division of application No. 13/175,681, filed on Jul. 1, 2011, now Pat. No. 9,923,751.

(51) Int. Cl.
H04B 7/00 (2006.01)
H04L 27/34 (2006.01)
(Continued)

(52) U.S. Cl.
CPC ............. *H04L 27/34* (2013.01); *H04H 20/69* (2013.01); *H04J 14/0282* (2013.01);
(Continued)

(58) Field of Classification Search
CPC ........ H04B 10/25759; H04B 10/07953; H04B 10/2581; H04B 10/27; H04B 10/2725;
(Continued)

(56) References Cited

U.S. PATENT DOCUMENTS 6,198,910 B1 * 3/2001 Hanley ................. H04W 28/16
455/67.11
6,437,895 B1 8/2002 Farhan et al.
(Continued)

OTHER PUBLICATIONS

Digital, (n.d.). Retrieved Mar. 9, 2020, from https://www.merriam-webster.com/dictionary/digital.*

*Primary Examiner* — Tanya T Motsinger
(74) *Attorney, Agent, or Firm* — Chernoff, Vilhauer, McClung & Stenzel, LLP

(57) ABSTRACT

Methods and apparatuses are provided to modify existing overlay system architectures in a cost effective manner to meet the growing demand for narrowcast services and to position the existing overlay systems for additional future modifications. The implementations of the improved overlay system of this disclosure re-digitize narrowcast analog signals after they have been QAM modulated and upconverted to RF frequencies and replace the analog narrowcast transmitters with digital narrowcast transmitters. In the fiber nodes, the received narrowcast signals are converted back to analog signals and combined with analog broadcast signals for transmission to the service groups.

18 Claims, 7 Drawing Sheets

(51) Int. Cl.
*H04J 14/02* (2006.01)
*H04H 20/69* (2008.01)

(52) U.S. Cl.
CPC ....... *H04J 14/0298* (2013.01); *H04J 14/0232* (2013.01); *H04J 14/0246* (2013.01); *H04J 14/0247* (2013.01)

(58) Field of Classification Search
CPC . H04B 10/60; H04J 14/02; H04J 14/00; H04J 14/0209; H04J 14/0213
See application file for complete search history.

(56) References Cited

U.S. PATENT DOCUMENTS

| | | | |
|---|---|---|---|
| 6,519,773 B1 * | 2/2003 | Ahmed | H04N 21/2365 348/553 |
| 6,874,161 B1 | 3/2005 | Wasserman et al. | |
| 7,266,298 B2 * | 9/2007 | Barker | H04B 10/079 398/33 |
| 7,924,410 B2 | 4/2011 | Fischi | |
| 8,503,546 B1 | 8/2013 | Ashrafi | |
| 2002/0080884 A1 | 6/2002 | Lee et al. | |
| 2003/0016415 A1 | 1/2003 | Jun et al. | |
| 2004/0181800 A1 | 9/2004 | Rakib et al. | |
| 2004/0214603 A1 * | 10/2004 | Tanabe | H04B 10/25753 455/561 |
| 2004/0228273 A1 | 11/2004 | Kurobe et al. | |
| 2005/0213992 A1 | 9/2005 | Piehler | |
| 2006/0063490 A1 * | 3/2006 | Bader | H04B 1/0483 455/45 |
| 2006/0165413 A1 | 7/2006 | Schemmann et al. | |
| 2007/0249308 A1 | 10/2007 | Gao et al. | |
| 2007/0297801 A1 | 12/2007 | Mostert et al. | |
| 2008/0063401 A1 | 3/2008 | Agazzi | |
| 2008/0232807 A1 | 9/2008 | Lee et al. | |
| 2008/0260044 A1 | 10/2008 | Yun et al. | |
| 2009/0028564 A1 * | 1/2009 | Villarruel | H04J 14/0226 398/66 |
| 2009/0180035 A1 * | 7/2009 | Muller | H03H 7/0153 348/729 |
| 2010/0135674 A1 | 6/2010 | Hermel | |
| 2010/0309827 A1 | 12/2010 | Choi | |
| 2010/0316382 A1 * | 12/2010 | Litvin | H04B 10/2916 398/79 |
| 2011/0033189 A1 | 2/2011 | Biegert et al. | |
| 2011/0236025 A1 | 9/2011 | Wagner et al. | |
| 2011/0255870 A1 | 10/2011 | Grigoryan et al. | |
| 2012/0047415 A1 | 2/2012 | Djordjevic et al. | |
| 2012/0110631 A1 | 5/2012 | Rakib | |
| 2012/0177065 A1 | 7/2012 | Winzer | |
| 2012/0213259 A1 | 8/2012 | Renken et al. | |
| 2013/0160068 A1 | 6/2013 | Pradzynski et al. | |
| 2013/0216221 A1 | 8/2013 | Zhang et al. | |
| 2014/0016583 A1 * | 1/2014 | Smith | H04W 72/04 370/329 |
| 2014/0282801 A1 * | 9/2014 | Bowler | H04B 10/25751 725/129 |
| 2015/0020134 A1 * | 1/2015 | Bowler | H04N 21/2383 725/116 |

* cited by examiner

DIGITAL OPTICAL TRANSMITTER FOR DIGITIZED NARROWCAST SIGNALS

CROSS-REFERENCE TO RELATED APPLICATIONS

This application is a division of U.S. application Ser. No. 13/175,681, filed on Jul. 1, 2011 the contents of which are incorporated herein.

TECHNICAL FIELD

This disclosure relates to an overlay system.

BACKGROUND

A cable-based system can be used to deliver high-definition digital entertainment and telecommunications such as video, voice, and high-speed Internet services from a headend to subscribers over an existing cable television network. The cable television network can take the form of an all-coax, all-fiber, or hybrid fiber/coax (HFC) network.

Generally, analog video signals and digital bit streams representing various services (e.g., video, voice, and Internet) from various digital information sources are received at the headend and converted to radio frequency (RF) optically modulated signals for transmission over the cable network. One or more services output from the headend can occupy a specific 6 MHz-wide RF channel having a center frequency that typically falls within a frequency range having a lower limit of 50 MHz and an upper limit of 1002 MHz.

For digital bit streams, in some implementations, each of the digital bit streams is encoded to produce a corresponding digital QAM symbol stream. Each digital QAM symbol stream is root-nyquist filtered, converted to an analog QAM symbol stream, and QAM modulated onto an RF carrier signal having a frequency that corresponds to a center frequency of a 6 MHz-wide RF channel. For digital broadcast services (e.g., service that are intended for all subscribers in a serving area) such as video, the RF carrier signal frequency typically falls within a frequency range having a lower limit of 550 MHz and an upper limit of 750 MHz. For digital narrowcast services (e.g., services that are intended for a single customer in a serving area) such as video on demand, internet data, and telephony, for example, the RF carrier signal frequency can vary from system to system. Broadcast analog video signals received at the headend are modulated onto an RF carrier signal having a frequency that typically falls within a frequency range having a lower limit of 50 MHz and an upper limit of 550 MHz.

Some or all of the analog single-channel modulated RF carrier signals can be combined to produce an analog multi-channel RF signal. One or more analog optical transmitters convert the analog single-channel modulated RF carrier signals and/or multi-channel RF signals to optically modulated signals.

Generally, the RF optically modulated signals are transmitted from the headend via one or more fibers to one or more fiber nodes. Each of the fiber nodes includes an optical receiver that converts the received optically modulated signals representing broadcast and narrowcast services to electrical RF signals. The electrical RF signals then are transmitted to receiving devices such as cable modems (CMs) and/or settop boxes (STBs) that are served by the fiber node. All of the receiving devices served by the fiber node can receive the electrical RF signals. If the electrical RF signal represents a broadcast service, each receiving device served by the fiber node can process and deliver the corresponding service to the subscriber. If the electrical signal represents a narrowcast service, the receiving device to which the electrical signal is addressed can process and deliver the corresponding service to the subscriber.

In a so-called overlay system, an analog broadcast optical transmitter transmits broadcast RF optically modulated signals on a first fiber. For narrowcast services, for each fiber node there can exist an analog narrowcast optical transmitter in the headend to output narrowcast RF optically modulated signals at a particular wavelength designated for the fiber node. The narrowcast RF optically modulated signals output by an analog narrowcast optical transmitter can comprise one or more RF channels. A multiplexer combines the narrowcast RF optically modulated signals produced by the narrowcast optical transmitters to produce a multi-wavelength RF optically modulated signal on a second fiber. The broadcast RF optically modulated signal transmitted on the first fiber and the multi-wavelength RF optically modulated signal transmitted on the second fiber can be received at an optical transition node ("OTN"). At the OTN, the narrowcast signals are demultiplexed by an optical demultiplexer. For each narrowcast signal output from the demultiplexer, an optical combiner combines the broadcast signal and the narrowcast, and the resulting signal is transmitted to the designated fiber node for delivery to the receiving devices as discussed above.

There is a growing demand for narrowcast services; however, the existing overlay system architecture is not adequate to meet the growing demand for narrowcast services.

DETAILED DESCRIPTION

Various implementations of this disclosure modify existing overlay system architectures in a cost effective manner to meet the growing demand for narrowcast services and to position the existing overlay systems for additional future modifications. The implementations of the improved overlay system of this disclosure re-digitize narrowcast analog signals after they have been QAM modulated and upconverted to RF frequencies and replace the analog narrowcast transmitters with digital narrowcast transmitters. In the fiber nodes, the received narrowcast signals are converted back to analog RF modulated signals and combined with analog RF modulated broadcast signals for transmission to the service groups.

Although this disclosure makes reference to a cable-based system, this disclosure is not intended to be limited to a cable-based system.

Figure 1:
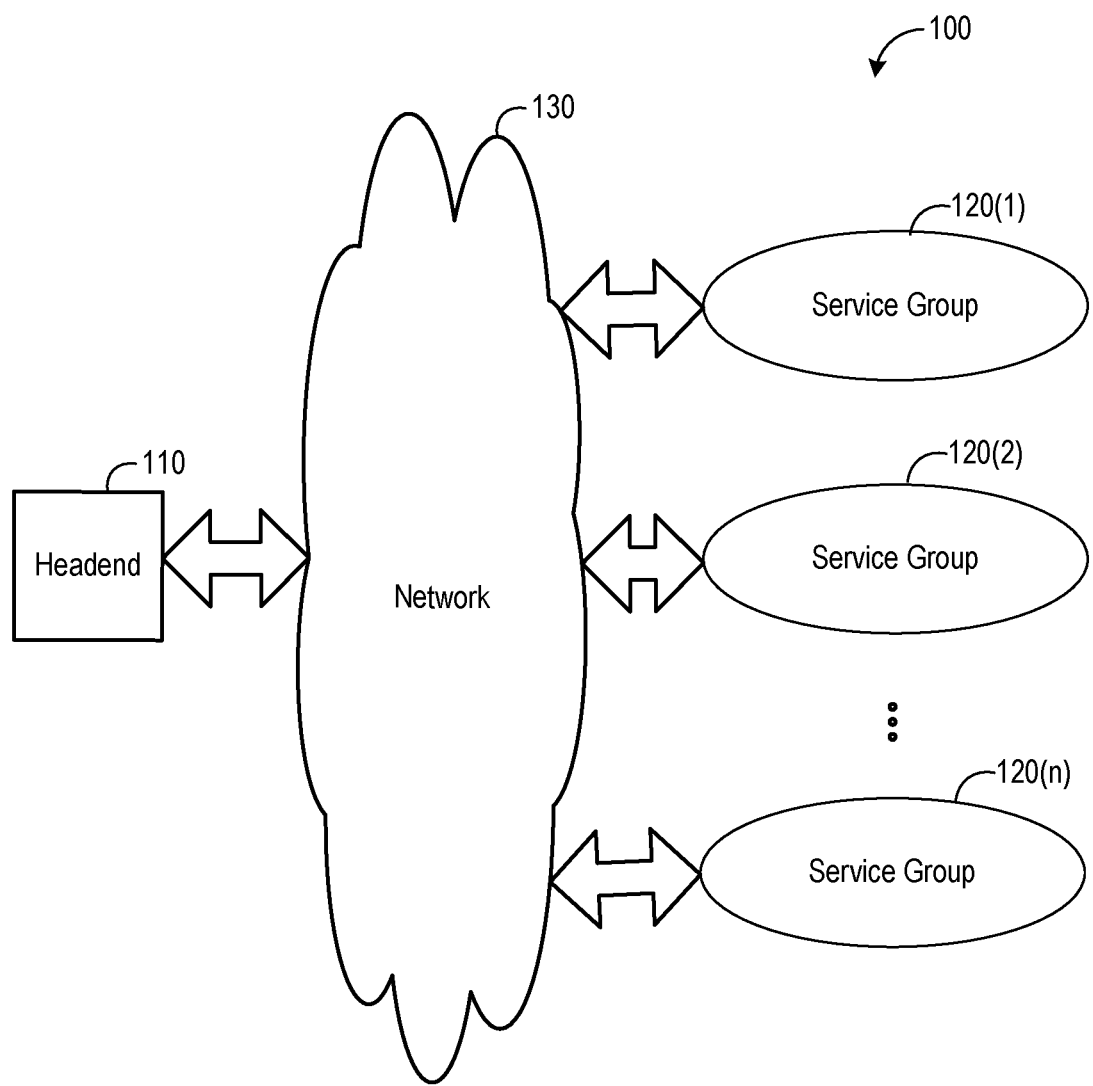
FIG. 1 is a block diagram illustrating an example cable-based system.

FIG. 1 illustrates an example cable-based system 100 operable to deliver high-definition digital entertainment and telecommunications such as video, voice, and high-speed Internet services over a cable network 130 between a headend 110 and one or more service groups of receiving devices such as cable modems (CMs) and/or settop boxes (STBs) 120(1), . . . , 120(n).

Analog video signals and digital bit streams representing various services (e.g., video, voice, and Internet) from various digital information sources are received at the headend 110 and converted to radio frequency (RF) optically modulated signals for transmission over the cable network 130. The cable network 130 can take the form of an all-coax, all-fiber, or hybrid fiber/coax (HFC) network. Traffic transferred from the headend 110 to a receiving device can be said to travel in a downstream direction; conversely, traffic transferred from a receiving device to the headend 110 can be said to travel in an upstream direction.

Figure 2:
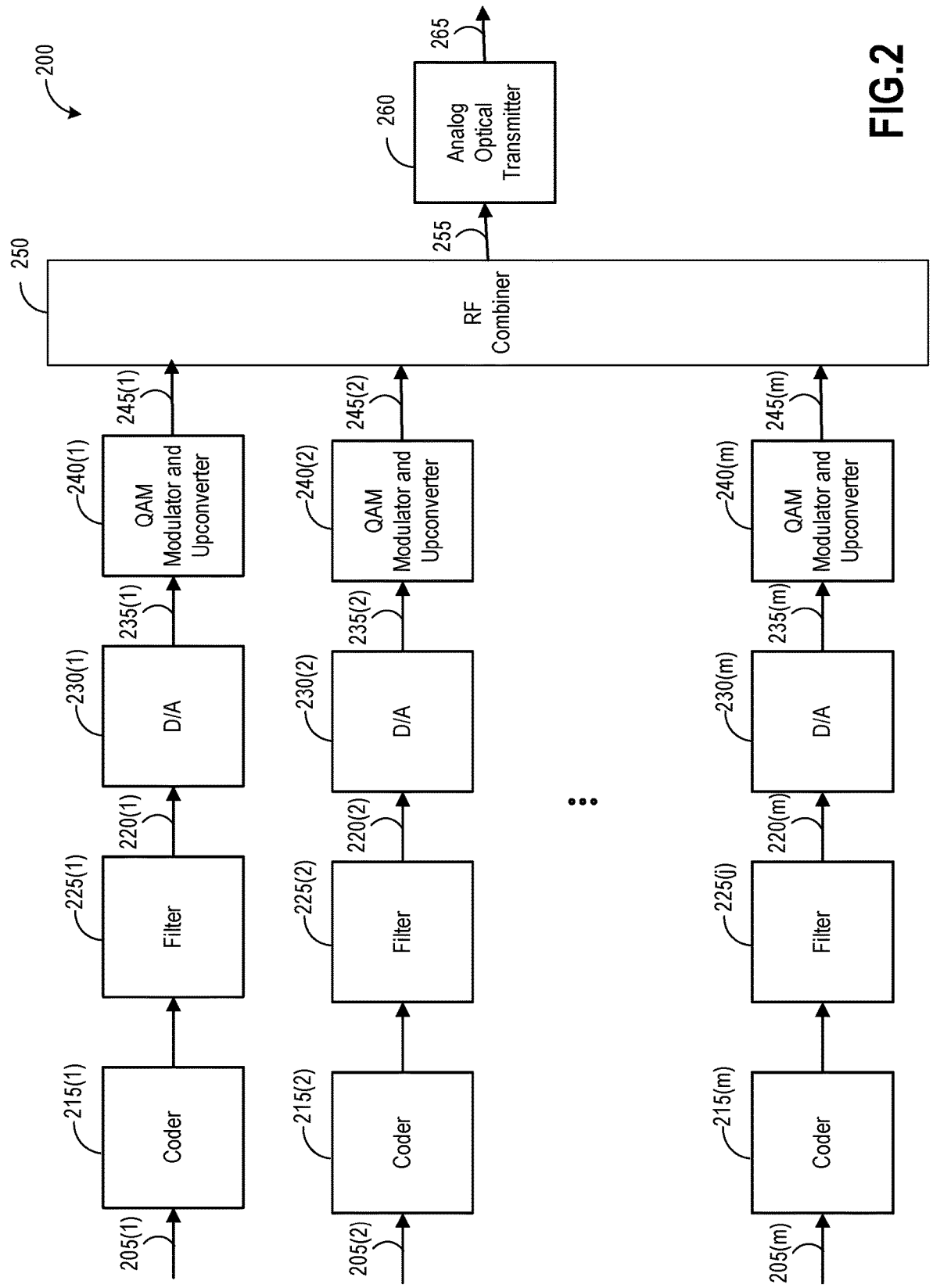
FIG. 2 is a block diagram illustrating an example processing chain in a headend to convert one or more digital bit streams to an RF optically modulated signal.

FIG. 2 illustrates an example processing chain 200 in the headend 110 to convert one or more digital bit streams 205(1), . . . , 205(m) to an RF optically modulated signal 265. For each digital bit stream 205(j), j=1, . . . , m, a channel coder 215(j) encodes the digital bit stream 205(j) to produce a corresponding digital quadrature amplitude modulation (QAM) symbol stream 220(j), for example, as specified in ITU-T Recommendation J.83 (12/07), Annex B [ITU-T J.83-B], "Digital multi-programme systems for television sound and data services for cable distribution."

Each of the digital QAM symbol streams 220(j), j=1, . . . , m, are converted to an analog QAM symbol stream 235(j) by a digital to analog (D/A) converter 230(j). Each of the analog QAM symbol streams 235(j), j=1, . . . , m, is modulated onto an RF carrier signal having a frequency $f_j$ that corresponds to a center frequency of a 6 MHz-wide RF channel by a QAM modulator and upconverter 240(j).

The analog single-channel modulated RF carrier signals 245(1), . . . , 245(m) can be combined by an RF combiner 250 to produce an analog multi-channel RF signal 255. An analog optical transmitter 260 converts the analog multi-channel RF signal 255 to an RF optically modulated signals 265.

One or more of the processing blocks of the example processing chain 200 can be re-arranged and/or eliminated and additional blocks can be added to achieve a desired result. For example, the signals can be converted to analog signals later in the chain, for example, after the channels are combined.

Figure 3:
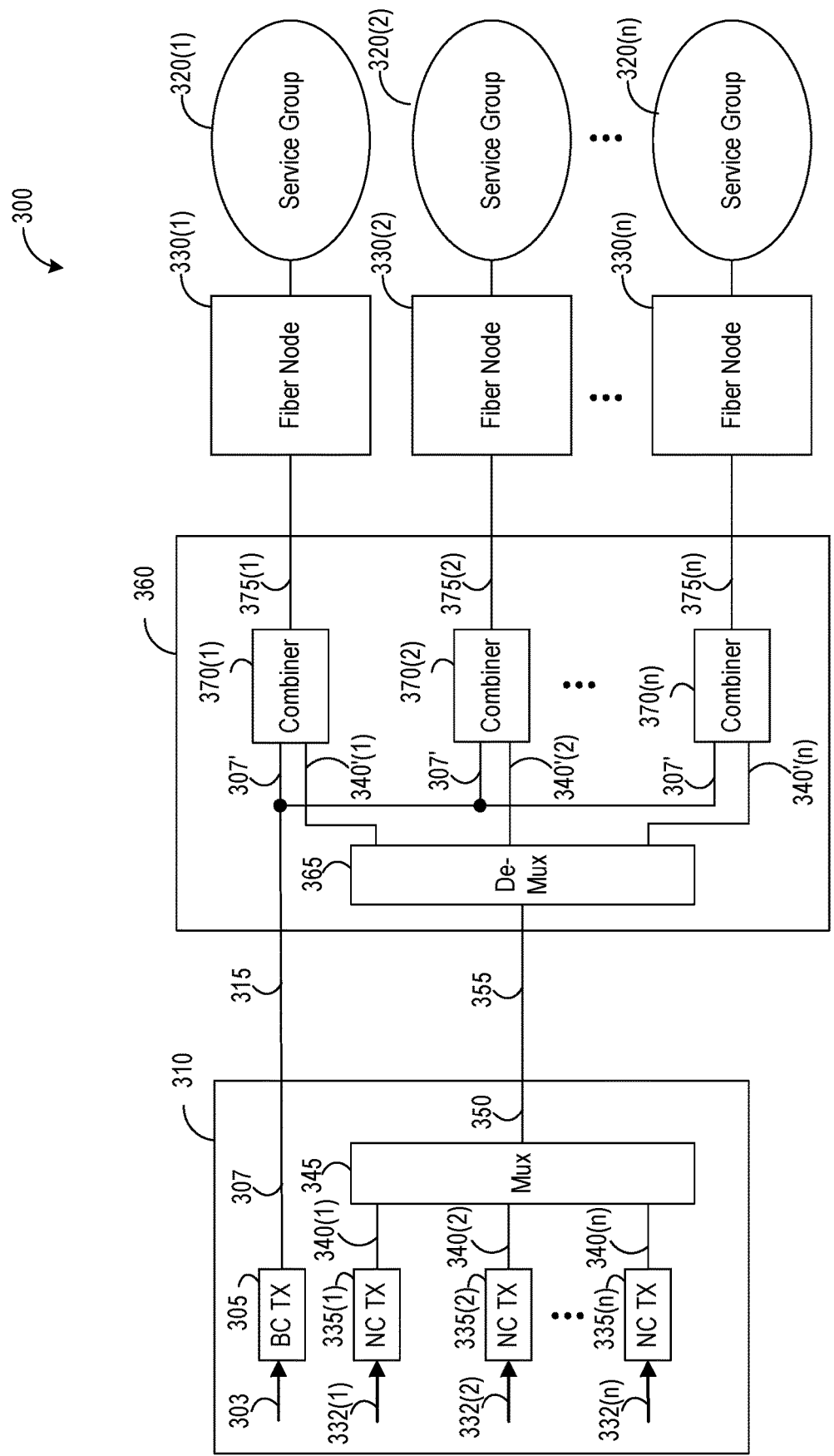
FIG. 3 is a block diagram illustrating an existing overlay system.

FIG. 3 illustrates an existing overlay system 300. In the headend 310, a broadcast analog optical transmitter 305 receives an analog single or multi-channel RF signal 303 (such as one of the analog single-channel modulated RF carrier signals 245(j) or the analog multi-channel RF signal 255 of FIG. 2). The analog broadcast transmitter 305 converts the analog RF signal 303 to a broadcast RF optically modulated signal 307 and transmits the broadcast RF optically modulated signal 307 downstream on a first fiber 315.

For narrowcast services, for each fiber node 330(i), i=1 . . . , n in the overlay system 300, there exists a corresponding narrowcast analog optical transmitter 335(i) in the headend 310 to produce narrowcast RF optically modulated signals designated for the fiber node 330(i). Each of the narrowcast analog optical transmitters 335(i), i=1 . . . , n receives an analog single or multi-channel RF signal 332(i) (such as one of the analog single-channel modulated RF carrier signals 245(j) or the analog multi-channel RF signal 255 of FIG. 2) and converts the RF signal 332(i) to a narrowcast RF optically modulated signal 340(i) at a particular wavelength $\lambda_i$.

An optical multiplexer 345 multiplexes (e.g., via dense wavelength division multiplexing) the narrowcast RF optically modulated signals 340(1), . . . , 340(n) produced by the narrowcast analog optical transmitters 335(1), . . . , 335(n), respectively, to produce a multi-wavelength RF optically modulated signal 350 for transmission on a second fiber 355.

The broadcast RF optically modulated signal 307 transmitted on the first fiber 315 and the multi-wavelength RF optically modulated signal 350 transmitted on the second fiber 355 can be received at an optical transition node ("OTN") 360. At the OTN 360, the narrowcast signals are demultiplexed by an optical demultiplexer 365. For each narrowcast signal 340'(i), i=1, . . . , n (representing narrowcast RF optically modulated signal 340(i)) output from the demultiplexer 365, an optical combiner 370(i) optically combines the narrowcast signal 340'(i) and the broadcast signal 307' (representing broadcast RF optically modulated signal 307). The resulting signal 375(i) is transmitted to the designated fiber node 330(i).

Each of the fiber nodes 330(i), i=1, . . . , n includes an optical receiver that converts the received RF optically modulated signal 375'(i) (representing signal 375(i)) to an electrical signal including broadcast and narrowcast services. The electrical signal then can be transmitted to receiving devices that are served by the fiber node 330(i) (e.g., service group 320(i)). All of the receiving devices served by the fiber node can receive the electrical signals. The portion of the electrical signal representing a broadcast service is processed by each receiving device served by the fiber node and then the broadcast service is delivered to the subscriber. For the portion of the electrical signal representing a narrowcast service, the receiving device to which the electrical signal is addressed can process and deliver the corresponding narrowcast service to the subscriber.

As discussed above, there is a growing demand for narrowcast services. Delivering more narrowcast content to meet the growing demand can require an increase in the number of narrowcast channels used by each narrowcast optical transmitter 335(i), i=1 . . . , n. Node segmentation also can be used to deliver more narrowcast content to a fiber node. With node segmentation, additional narrowcast content is delivered to a fiber node by transmitting narrowcast content at a plurality of wavelengths designated for the fiber node. Thus, node segmentation can require more narrowcast optical transmitters 335(i), i=1 . . . , n to produce narrowcast signals at the additional wavelengths for the fiber nodes.

Due to various effects, such as fiber nonlinear intermodulation effects, the number of narrowcast channels that can be used by each narrowcast optical transmitter 335(i), i=1 . . . , n can be limited. Furthermore, an increase in the number of wavelengths in the multi-wavelength RF optically modulated signal 350 transmitted on the second fiber 355 can require additional EDFA amplifiers (not shown) along the fiber link 355 between the headend 310 and the OTN 360 to preserve system performance. Due to these limitations, for example, existing overlay system architectures, such as the overlay system 300 in FIG. 3, are not adequate to meet the growing demand for narrowcast services. It further should be noted that to maintain an appropriate relative signal level of the broadcast signal and narrowcast signal output from each of the fiber nodes 330(i), the optical levels of the broadcast signal 307' and narrowcast signal 340'(i) input to each combiner 370(i) must be carefully controlled. This can be costly.

Further, a substantial portion of the existing downstream fiber links are in an overlay architecture similar to the overlay system 300 of FIG. 3 with limited amounts of fiber capacity available to an OTN 360. To increase the number of fibers run to an OTN involves cost-prohibitive outside plant work to, for example, trench new fiber capacity. Thus, it can be desirable to modify the existing architecture in a cost effective manner to meet the growing demand for narrowcast services and position the existing overlay systems for additional future modifications, for example, to improve performance and meet future requirements such as the requirements of the converged media access platform (CMAP).

Figure 4:
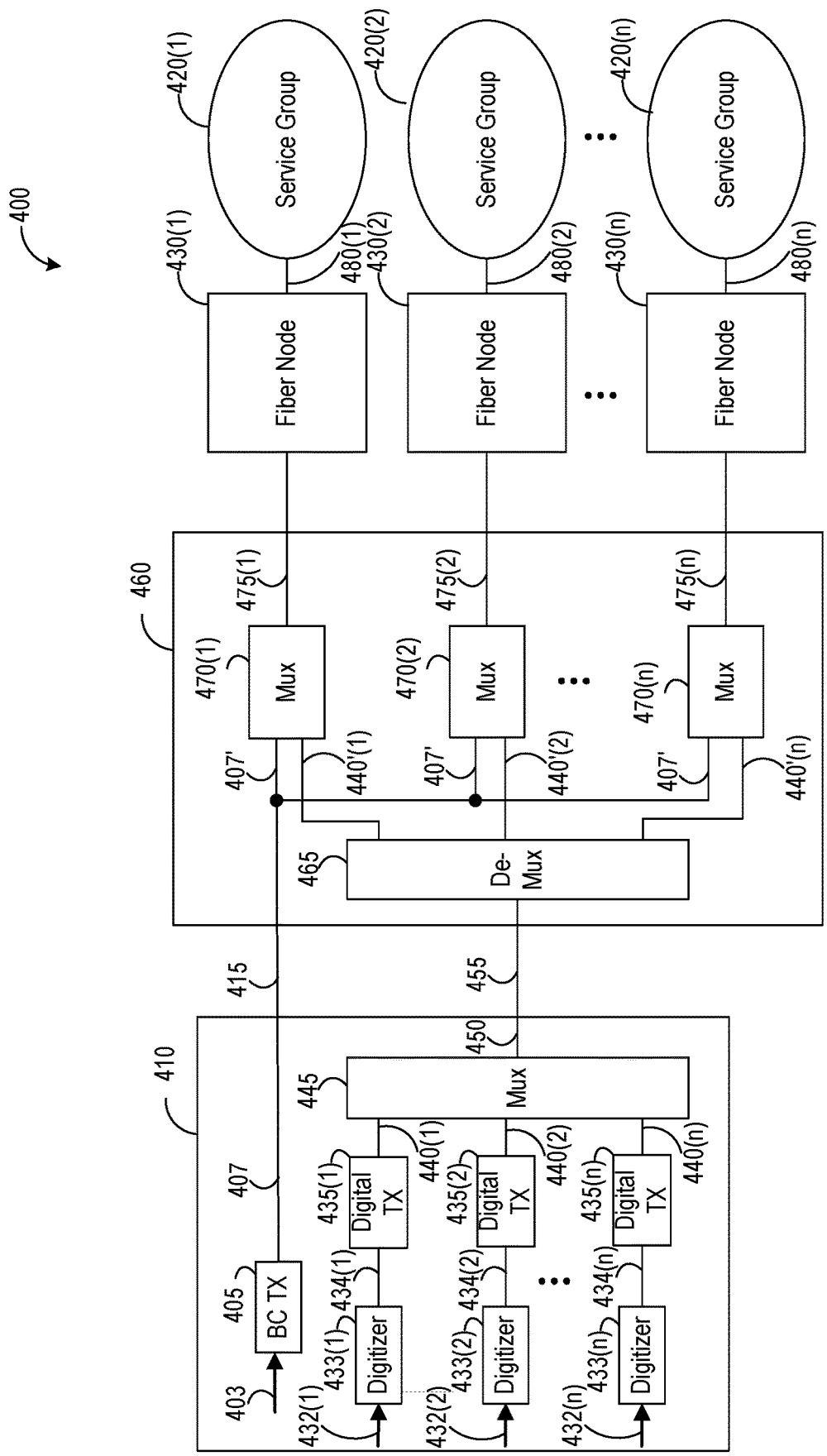
FIG. 4 is a block diagram illustrating an improved based overlay system.

FIG. 4 illustrates an example implementation of an improved overlay system 400 to meet the growing demand for narrowcast services.

In the headend 410, a broadcast analog optical transmitter 405 receives an analog single or multi-channel RF signal 403 (such as one of the analog single-channel modulated RF carrier signals 245(j) or the analog multi-channel RF signal 255 of FIG. 2). The analog broadcast transmitter 405 converts the analog RF signal 403 to a broadcast RF optically modulated signal 407 and transmits the broadcast RF optically modulated signal 407 downstream on a first fiber 415.

Figure 5:
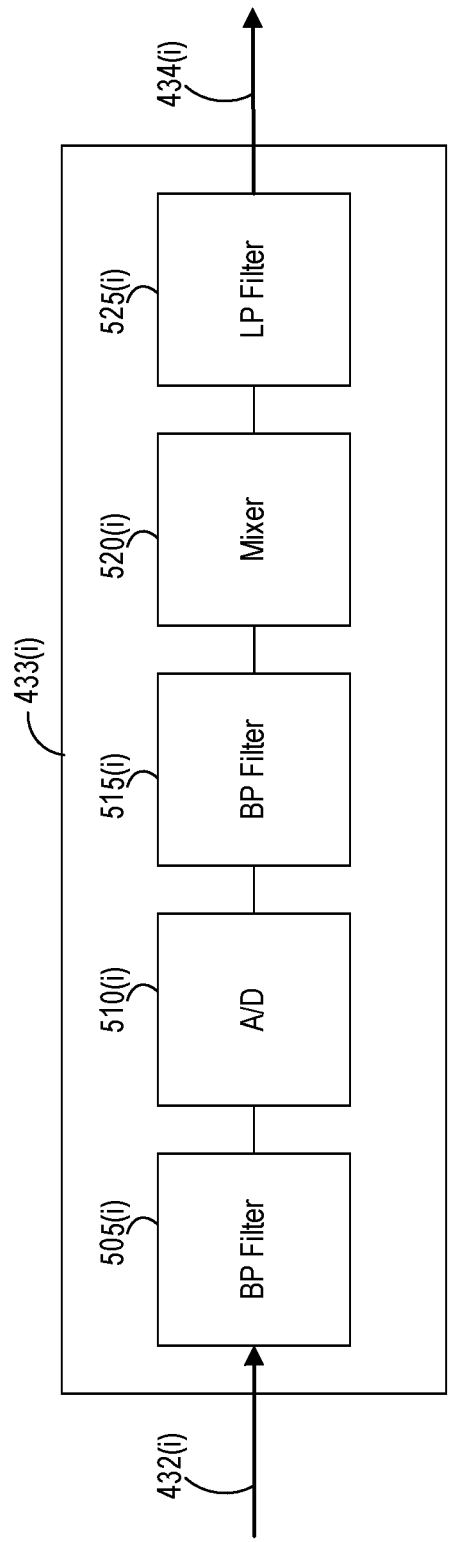
FIG. 5 is a block diagram illustrating an example implementation of the digitizers in overlay system of FIG. 4.

Digitizers 433(i), i=1 . . . , n re-digitize the analog-modulated RF narrowcast signals 432(i), i=1 . . . , n (e.g., one of the analog single-channel modulated RF carrier signals 245(j) or the analog multi-channel RF signal 255 of FIG. 2), respectively, destined for narrowcast transmitters. As discussed above with respect to FIG. 2, the analog RF signals 432(i), i=1 . . . , n are derived from digital bit streams that are QAM encoded and modulated. Because these RF signals 432(i), i=1 . . . , n are derived from digital bit streams that are converted to analog signals, among other reasons, it would not be obvious to one of ordinary skill in the art to re-digitize these RF signals. FIG. 5 illustrates an example implementation of the digitizer 433(i) in FIG. 4. A bandpass filter 505(i) filters the analog RF signal 432(i) to filter out signals outside the frequency range for analog RF signal 432(i). The resulting signal is converted to a digital signal by A/D converter 510(i). The digital signal can be filtered further by bandpass filter 515(i), downconverted to a baseband signal by a digital mixer 520(i), and low pass filtered by filter 525(i) to produce a digitized signal 434(i). This disclosure is not limited to any particular digitizer. Any existing or future developed digitizer is intended to be included within the scope of this disclosure.

Referring back to FIG. 4, the digitized RF signals 434(i), i=1 . . . , n are received by narrowcast digital optical transmitters 435(i), i=1 . . . , n, which convert the digitized RF signals to narrowcast RF optically modulated signals 440(i), i=1 . . . , n at particular wavelength $\lambda_i$, i=1, . . . n, respectively.

An optical multiplexer 445 combines (e.g., via dense wavelength division multiplexing) the narrowcast RF optically modulated digital signals 440(i), . . . , 440(n) produced by the narrowcast digital optical transmitters 435(1), . . . , 435(n), respectively, to produce a multi-wavelength RF optically modulated signal 450 for transmission on a second fiber 455.

The broadcast RF optically modulated signal 407 transmitted on the first fiber 415 and the multi-wavelength RF optically modulated signal 450 transmitted on the second fiber 455 can be received at OTN 460. At the OTN 460, the narrowcast signals can be demultiplexed by an optical demultiplexer 465. For each narrowcast signal 440'(i), i=1, . . . , n (representing narrowcast RF optically modulated signal 440(i)) output from the demultiplexer 465, an optical multiplexer 470(i) multiplexes (e.g., via dense wavelength division multiplexing) the narrowcast signal 440'(i) and the broadcast signal 407' (representing broadcast RF optically modulated signal 407). The resulting signal 475(i) transmitted to the designated fiber node 430(i).

Each of the fiber nodes 430(i), i=1, . . . , n converts the received RF optically modulated signals 475'(i), i=1, . . . , n (representing signal 475(i)) to electrical signals including broadcast and narrowcast services. The electrical signals 480(i) then are transmitted to the corresponding service group 420(i).

Figure 6:
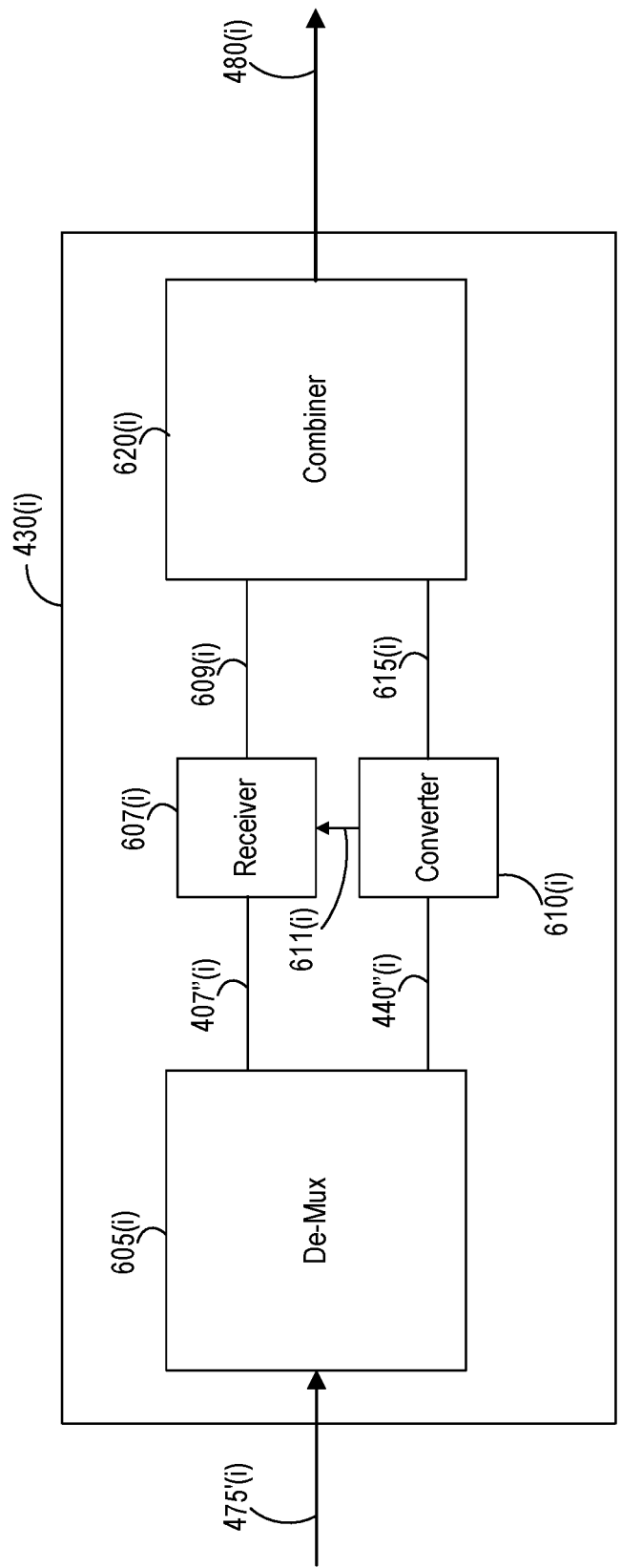
FIG. 6 is a block diagram illustrating an example implementation of the fiber nodes in the overlay system of FIG. 4.

FIG. 6 illustrates an example implementation of the fiber nodes 430(i). In each of the fiber nodes 430(i), i=1, . . . , n, the multiplexed signal 475'(i) is demultiplexed by an optical demultiplexer 605(i) to produce a broadcast signal 407" that represents the broadcast signal 407'(i) and a narrowcast signal 440"(i) that represents the narrowcast signal 440'(i). A receiver 607(i) extracts the broadcast RF-modulated electrical signal 609(i) from the optical broadcast signal 407"(i) received from the demultiplexer 605(i). The narrowcast digital optical signal 440"(i) is converted to an analog RF-modulated electrical signal 615(i) by converter 610(i) and then the analog narrowcast signal 615(i) and the analog broadcast signal 609(i) are electrically combined by combiner 620(i) to produce electrical signal 480(i).

Figure 7:
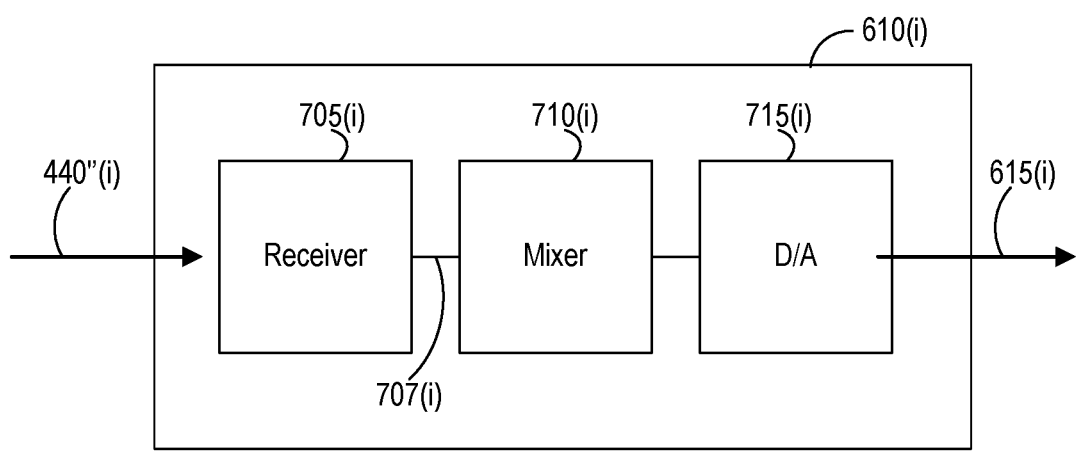
FIG. 7 is a block diagram illustrating an example implementation of the converters in the fiber nodes in FIG. 6.

FIG. 7 illustrates an example implementation of the converter 610(i) in FIG. 6. A receiver 705(i) extracts the digital signal 707(i) from the optical narrowcast signal 440"(i) received from the demultiplexer 605(i) of FIG. 6. An upconverter 710(i) frequency shifts the digital signal 707(i) to the appropriate channel frequency and the resulting signal is converted to an analog signal 615(i) by D/A converter 715.

By re-digitizing the narrowcast analog RF signals (such as one of the analog single-channel modulated RF carrier signals 245(j) or the analog multi-channel RF signal 255 of FIG. 2) and replacing the analog narrowcast transmitters 335(i), i=1 . . . , n with digital narrowcast transmitters 435(i), i=1 . . . , n, the number of narrowcast channels per narrowcast transmitter may increase due to the reduced signal to noise requirements of digital transmission technologies. Furthermore, an increase in the number of wavelengths in the multi-wavelength RF optically modulated signal 450 transmitted on the second fiber 455 may not require additional EDFA amplifiers along the fiber link 455 between the headend 410 and the OTN 460 to preserve system performance. Thus, the improved overlay system 400 may meet the growing demand for narrowcast services without requiring expensive plant rebuilds.

Furthermore, unlike in the existing overlay system architectures, in the overlay systems according to the present disclosure, the signal level of the narrowcast signals output from each of the fiber nodes 430(i) are independent of the optical level of the narrowcast signals 440'(i), 440"(i). This independence results from the narrowcast signals output from each of the fiber nodes 430(i) being reconstructed from digital data streams. Thus, provided the optical levels are sufficient to prevent data errors, the variation in the optical level of the narrowcast signals 440'(i), 440"(i) should not affect the signal level of the narrowcast signals output from each of the fiber nodes 430(i). Although the signal level of the broadcast signals output from each of the fiber nodes 430(i) can depend on the optical level of the broadcast signals 407'(i), 407"(i), this independence can be acceptable since at least the signal level of the narrowcast signals output from each of the fiber nodes 430(i) are independent of the optical level of the narrowcast signals 440'(i), 440"(i). Thus, unlike the existing overlay system architectures, the optical levels of the broadcast signals 407', 407" and narrowcast signals 440'(i), 404"(i) may not require carefully control to maintain an acceptable relative signal level of the broadcast signals and narrowcast signals output from each of the fiber nodes 430(i). Thus, the cost overlay systems according to the present disclosure can be lower than existing overlay system architectures.

Nevertheless, in some implementations, the optical level of the broadcast signal (e.g., broadcast signal 407"(i)) can be monitored based on known and future developed methods to maintain an appropriate signal level for output signal level 609(i). For example, the receiver 607(i) can be equipped with an optical input level monitor to monitor the optical level of the broadcast signal 407"(i). When the optical level changes, the receiver 607(i) can adjust its gain to maintain a constant output signal level for broadcast signal 609(i). As another example, the receiver 607(i) can implement an automatic gain control loop to maintain a constant output signal level for broadcast signal 609(i).

However, if there is a need to change the relative signal level of the broadcast signals and narrowcast signals output from each of the fiber nodes 430(i) (for example, due to a change in system broadcast and narrowcast loading), the existing overlay system architectures require truck-rolls to system nodes to adjust system components. The relative signal level of the broadcast signals and narrowcast signals output from each of the fiber nodes 430(i) can be more efficiently adjusted in overlay systems according to the present disclosure. For example, in some implementations, data instructing the converter 610(i) to adjust the output signal level of the narrowcast signal 615(i) and/or instructing the receiver 607 to adjust the output signal level of the broadcast signal 609(i) can be embedded in the narrowcast signals 440(i) and extracted by the converter 610(i). The converter 610(i) can provide a signal 611(i) to receiver 607 to adjust the output signal level of broadcast signal 609(i). In this way, the relative signal level of the broadcast signals and narrowcast signals output from each of the fiber nodes 430(i) can be adjusted remotely from a headend and may eliminate the need for truck-rolls to the field thereby resulting in cost savings.

While this specification contains many specific implementation details, these should not be construed as limitations on the scope of any invention or of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Particular implementations of the subject matter described in this specification have been described. Other implementations are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

The invention claimed is:

1. A fiber node comprising:
   a receiver configured to receive and convert an optical analog-modulated signal comprising one or more up-converted analog RF signals to a first RF electrical analog signal;
   a converter configured to receive and convert from a digital domain to an analog domain an optical digitally-modulated signal comprising one or more digital signals to a second RF electrical analog signal, the one or more digital signals each comprising a stream of binary digital bits; and
   a combiner configured to combine the first RF electrical analog signal and the second RF electrical analog signal.

2. The fiber node of claim 1 further comprising a demultiplexer configured to receive a multiplexed signal comprising the optical analog-modulated signal and the optical digitally-modulated signal wherein the demultiplexer is configured to demultiplex the optical analog-modulated signal and the optical digitally-modulated signal and deliver the demultiplexed signals to the receiver and the converter respectively.

3. The fiber node of claim 1 wherein the receiver is configured to convert the optical analog-modulated signal to the first RF electrical analog signal at a first predetermined signal level.

4. The fiber node of claim 3 wherein the receiver is configured to change the first predetermined signal level.

5. The fiber node of claim 1 wherein the converter is configured to convert the optical digitally-modulated signal to the second RF electrical analog signal at a second predetermined signal level.

6. The fiber node of claim 5 wherein the converter is configured to change the second predetermined signal level.

7. The fiber node of claim 1 wherein the optical digitally-modulated signal comprises an instruction to change the output signal level of the receiver and/or the converter.

8. A method comprising:
   receiving and converting an optical analog-modulated signal comprising one or more up-converted analog RF signals to a first RF electrical analog signal;
   receiving and converting from a digital domain to an analog domain an optical digitally-modulated signal comprising one or more digital signals to a second RF electrical analog signal, the one or more digital signals each comprising a stream of binary digital bits; and
   combining the first RF electrical analog signal and the second RF electrical analog signal.

9. The method of claim 8 further comprising converting the optical analog-modulated signal to the first RF electrical analog signal at a first predetermined signal level.

10. The method of claim 9 further comprising changing the first predetermined signal level.

11. The method of claim 8 further comprising converting the optical digitally-modulated signal to the second RF electrical analog signal at a second predetermined signal level.

12. The method of claim 11 further comprising changing the second predetermined signal level.

13. The method of claim 8 wherein the optical digitally-modulated signal comprises an instruction to change the output signal level of the receiver and/or the converter.

14. A fiber node comprising:
　means for receiving and converting an optical analog-modulated signal comprising one or more up-converted analog RF signals to a first RF electrical analog signal;
　means for receiving and converting from a digital domain to an analog domain an optical digitally-modulated signal comprising one or more digital signals to a second RF electrical analog signal, the one or more digital signals each comprising a stream of binary digital bits; and
　means for combining the first RF electrical analog signal and the second RF electrical analog signal.

15. The fiber node of claim 14, further comprising means for converting the optical analog-modulated signal to the first RF electrical analog signal at a first predetermined signal level.

16. The fiber node of claim 15 further comprising means for changing the first predetermined signal level.

17. The fiber node of claim 6 further comprising means for the optical digitally-modulated signal to the second RE electrical analog signal at a second predetermined signal level.

18. The fiber node of claim 17 further comprising means for changing the second predetermined signal level.

\* \* \* \* \*